US011906825B2

(12) United States Patent
Daryoush et al.

(10) Patent No.: US 11,906,825 B2
(45) Date of Patent: Feb. 20, 2024

(54) LEAKY-WAVE SPATIAL MODULATOR WITH INTEGRATED PHOTONIC CRYSTAL FOR ALL-OPTICAL ANALOG-TO-DIGITAL CONVERTERS

(71) Applicant: Drexel University, Philadelphia, PA (US)

(72) Inventors: Afshin S. Daryoush, Bryn Mawr, PA (US); Kai Wei, Philadelphia, PA (US)

(73) Assignee: Drexel University, Philadelphia, PA (US)

(*) Notice: Subject to any disclaimer, the term of this patent is extended or adjusted under 35 U.S.C. 154(b) by 0 days.

(21) Appl. No.: 17/060,095

(22) Filed: Oct. 1, 2020

(65) Prior Publication Data
US 2021/0096403 A1 Apr. 1, 2021

Related U.S. Application Data

(60) Provisional application No. 62/908,932, filed on Oct. 1, 2019.

(51) Int. Cl.
G02F 1/29 (2006.01)
G02F 1/035 (2006.01)
G02F 1/065 (2006.01)
G02F 1/295 (2006.01)

(52) U.S. Cl.
CPC ............ *G02F 1/0356* (2013.01); *G02F 1/065* (2013.01); *G02F 1/2955* (2013.01); *G02F 2201/126* (2013.01); *G02F 2201/127* (2013.01); *G02F 2203/12* (2013.01)

(58) Field of Classification Search
CPC ...... G02F 1/0356; G02F 1/065; G02F 1/2955; G02F 2201/126; G02F 2201/127; G02F 2203/12
USPC ............................................. 385/1–4, 8, 10
See application file for complete search history.

(56) References Cited

U.S. PATENT DOCUMENTS

| | | | |
|---|---|---|---|
| 7,006,733 B2* | 2/2006 | Galstian ............ | G02B 6/02066 385/28 |
| 2005/0238277 A1* | 10/2005 | Wang ...................... | A61B 1/05 385/8 |
| 2009/0317032 A1* | 12/2009 | D'Alessandro ......... | G02F 1/225 385/2 |
| 2014/0300694 A1* | 10/2014 | Smalley ............... | G03H 1/2294 348/40 |

OTHER PUBLICATIONS

"Electrode Structure for both Poling and Driving of the Electro-Optic Polymer in an Analog-to-Digital Converter based on an Optical Deflector" by Hadjloum et al, 23rd Telecommunications forum Telfor 2015, pp. 567-570 (Year: 2015).*

(Continued)

*Primary Examiner* — Robert Tavlykaev
(74) *Attorney, Agent, or Firm* — Schott, P.C.

(57) ABSTRACT

Performance improvement of an all-optical analog-to-digital converter (AOADC) addresses both RF and optical modeling of a leaky waveguide based optical spatial light modulator (SLM) using electro-optic (E-O) material. The E-O polymer provides improved sensitivity for SLM and achieves a broader bandwidth due to better velocity matching between RF and optical waves.

14 Claims, 9 Drawing Sheets

(56) References Cited

OTHER PUBLICATIONS

"Sensitivity improvement of broadband electro-optic polymer-based optical phase modulator using 1D and 2D photonic crystal structures" by Receveur et al, Chinese Optics Letters, vol. 15(1), paper 010003 (Year: 2017).*
"Design challenges of EO polymer based leaky waveguide deflector for 40 Gs/s all-optical analog-to-digital converters" by Hadjloum et al, Optics Communications, v. 373, pp. 82-90 (Year: 2016).*
"Leaky waveguide deflector for 40 GS/s and 6 bits all-optical analog-to-digital converters" by Hadjloum et al, Journal of the Franklin Institute, v. 354, pp. 8710-8720 (Year: 2017).*
"Effective in-device r33 of 735 pm/V on electro-optic polymer infiltrated silicon photonic crystal slot waveguides" by Wang et al, Optics Letters, vol. 36, No. 6, pp. 882-884 (Year: 2011).*
"Beam steering in GaInAs/GaAs slow-light Bragg reflector waveguide amplifier" by Gu et al., Applied Physics Letters, vol. 99, paper 211107 (Year: 2011).*

\* cited by examiner

LEAKY-WAVE SPATIAL MODULATOR WITH INTEGRATED PHOTONIC CRYSTAL FOR ALL-OPTICAL ANALOG-TO-DIGITAL CONVERTERS

TECHNICAL FIELD

The disclosed invention is in the field of microwave photonic devices employed in building digital receivers using efficient all-optical analog to digital convertors (AOADC).

BACKGROUND

Future telecommunication and remote sensing systems require a larger bandwidth of information to be processed. A common component in digitization of information are the analog-to-digital convertors (ADC), which are usually located at the end of an analog chain in a receiver and deal with baseband signals to be processed using digital signal processing algorithms. Canonical electronic-based ADC over 2 GSPS suffer from limited effective number of bits (ENOB) due to both electrical clock signal aperture jitters and comparator ambiguity of transistors used in flash, pipe-lined, folding, $\Delta$-$\Sigma$ or other electrical ADC structures. For example, to sample for frequency of 1000 MHz with 10 ENOB, a clock-sampling jitter of better than 125 fs is required with signal to noise (SNR) of better than 64 dB.

Optical techniques have provided added benefit of reducing aperture jitters and in one embodiment of hybrid optical-electrical ADC technique is proposed to combine optical sampling of time-stretched electrical signals being interleaved and then quantize detected interleaved electrical signals using a lower sampling rate ADC. Unfortunately, electrical domain quantizer outputs still have to be accurately stitched back together to form the original ADC of input information, which has been challenging for sampling rates above 10 GSPS.

On the other hand, AOADCs have been proposed even earlier than the hybrid solution for their promising high sampling rates, but unfortunately current AOADC designs have been deemed limited to a very low ENOB of under 4. In this invention a high-resolution ADC of about 8 ENOB having broadband sampling rate of over 40 GS/s using current material and fabrication techniques. Further E-O polymer material and microfabrication techniques will undoubtedly further improve ENOB of this SLM based AOADC.

The quantization mechanism of current optical ADCs is amplitude-domain modulation, which generally suffers from intensity fluctuation of optical signal and uneven power splitting from bit to bit in multi-channel structure. Our proposed solution is based on a spatial-domain light modulation device by providing a fixed amount of optical energy for all spatial angles that light being deflected. This approach provides a high signal-to-noise ratio (SNR), which provides immunity from optical power fluctuation. Meanwhile, because one single channel is used in the E-O SLM design, the channelization mismatch problem associated with the existing optical ADCs is automatically removed.

Spatial light modulation efficiency is a parameter that determines the AOADC performance including conversion rate, system loss, nonlinearity and overall device size. An introduction of PhC layer to an EO waveguide is to structurally improve the effective Pockels effect by reducing the required half-wave voltage $V_\pi$ for a fixed interaction length, leading to retard light propagation inside the optical waveguide with more photon leakage through the prism layer. Moreover, E-O polymer, such as CPO-1 chromophores on host material PMMI, is preferred here rather than the conventional crystalline E-O materials, such as $LiNbO_3$ (LN).

CPO-1/PMMI has a high (>70 pm/V) E-O coefficient, $r_{33}$, compared to LN (30 pm/V). Moreover, difference in velocity mismatch between optical and electric waves in CPO-1/PMMI compared to LN provides a broader bandwidth for a similar interaction length. Finally, polymers are more compatible to low cost Si-photonic manufacturing procedures than LN based circuits, which makes this design suitable for future large-scale Si-photonics based micro-circuit integration. Therefore, an important direction of design of SLM is based on E-O polymer for optical guides rather than E-O ceramics. The optical deflection angle of optical waveguide used in the SLM has a greater sensitivity to the applied RF signal by incorporating (1D, 2D, or 3D) PhC structures.

SUMMARY

An efficiently integrated electro-optic (E-O) based optical waveguide that is integrated with photonic crystal (PhC) structures forms a leaky waveguide that re-directs light to form a spatial light modulator (SLM). This significantly enhanced SLM is a core component in an AOADC. The sandwiched PhC layer is designed as a slow-wave structure and its custom design is increases deflection angle sensitivity of SLM on principal of leaky waveguide. A short optical pulse may be input to the custom designed SLM to optically sample the applied radio-frequency (RF) signal. Different RF signal power levels are related to different voltage levels and hence correspondingly to different electric fields in the E-O based optical waveguide.

The applied RF electric field causes index of refraction variation in the EO material based on Pockels effect and hence changes the exit angle of light in the optical leaky waveguide SLM based on principal of Snell's law and dispersion relationship. The E-O leaky waveguide integrated with PhC causes enhanced deflection angle of this particular device compared with other SLM devices. The AOADC is realized when optical sampled SLM is combined with physically separated optical aperture patterns, as optical quantizer. The deflected optical signal is collected by optical quantizer, which in a simple realization could be formed by $2^m$ rows and m columns of optical apertures followed with photo-detectors for m number of bits for AOADC. The photo-detected current of each column shows a digital word of lower light compared to threshold as (0) or higher light level compared to threshold as (1) for m collected bits. The output of N bits as digital word has direct correspondence with sampled strength of applied RF signal. Sensitivity of the SLM is dependent on performance of leaky wave optical deflector and is enhanced by photonic crystal (PhC) layer. Sampling rate of AOADC depends on periodicity of short optical pulses as sampler and velocity mismatch between RF and optical waves in E-O based traveling wave optical deflector. The number of bits in AOADC, N, is dependent on the maximum deflection angle of SLM and angular resolution of focused optical beam.

This spatial light modulator leads to its broadband modulation bandwidth and high resolution due to integrated PhC layer. This highly efficient SLM results in high sampling rate and high resolution AOADC.

For low cost manufacturing E-O polymer that are compatible with Si-Photonics are considered. The SLM sweeps deflection angles as result of the applied RF electrical field. This variation of deflected angle is then quantized using optical coding mask followed by an array of high-speed photodetectors. Photonic crystal (PhC) structures, such as 1D PhC, are integrated to SLM for enhance performance in terms of increased effective number of bits (ENOB). The leakage coefficient of the spatial modulator is optimized and enhanced to achieve the best trade-off between sampling rate and the resolution. 1D PhC layer could be placed as superstrate or substrate with respect to E-O leaky waveguide. For ease of access from both optical and RF perspective, a broadband transition of capacitively grounded travelling-wave electrode structure is designed with DC poling contacts. With the enhanced effective E-O coefficient of 136 pm/V, the designed E-O spatial modulator allows an AOADC operating at 40 giga-samples-per-seconds with an estimated ENOB of about 8 bits on RF signals with Nyquist bandwidth of 20 GHz.

DETAILED DESCRIPTION OF THE DRAWINGS

The summary, as well as the following detailed description, is further understood when read in conjunction with the appended drawings. For the purpose of illustrating the invention, the drawings show exemplary embodiments of the invention. The invention, however, is not limited to the specific methods, compositions, and devices disclosed. In addition, the drawings are not necessarily drawn to scale.

Figure 1:
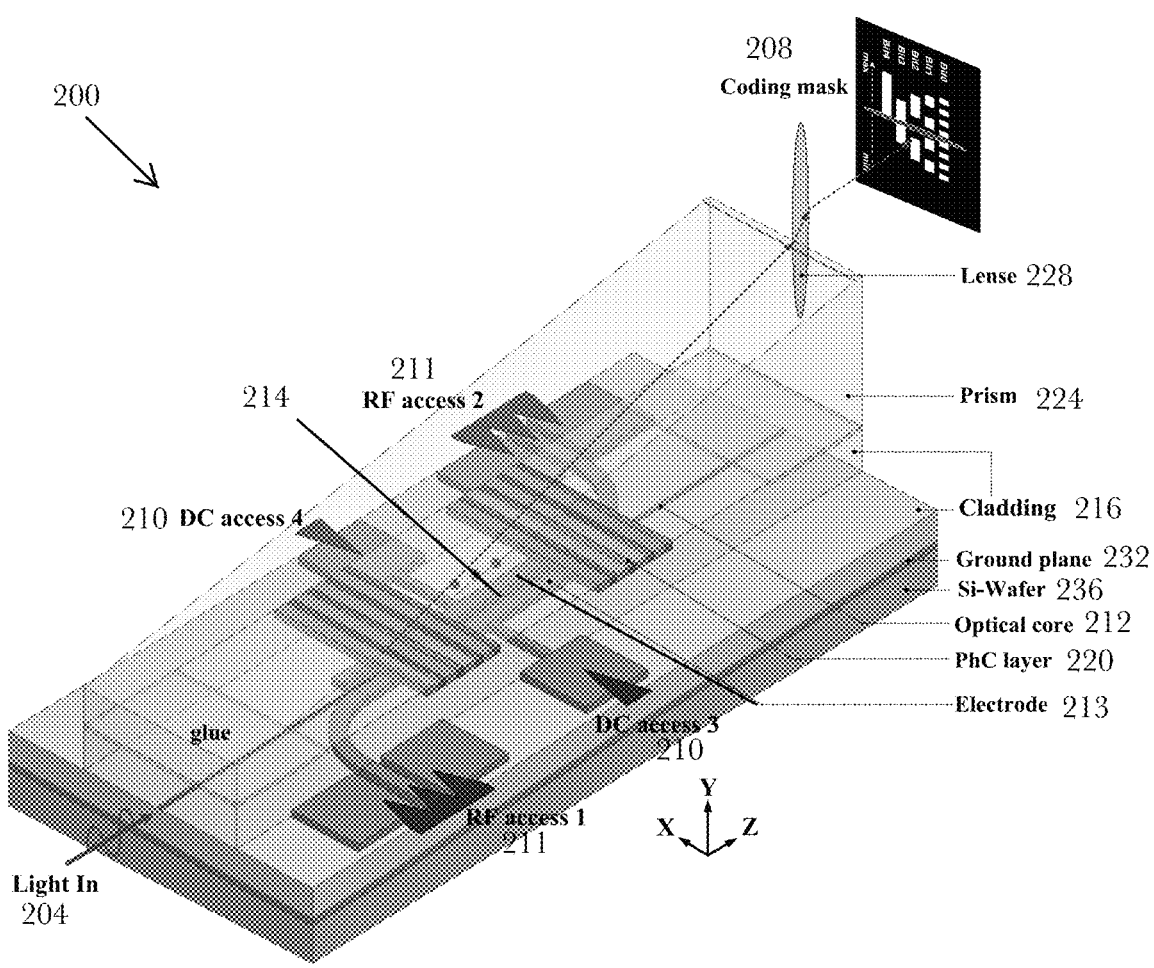
FIG. 1 shows an all-optical ADC based on SLM sampler realized using 1D PhC and optical aperture based optical quantizer.
Figure 3A:
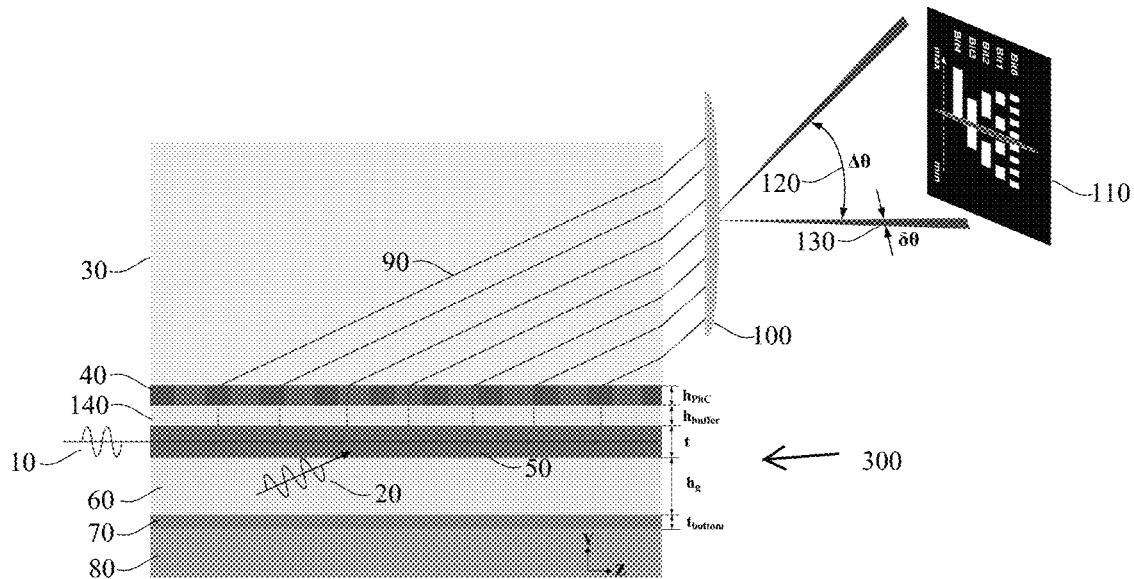
FIG. 3A depicts the conceptual representation of a spatial light modulator based AOADC.
Figure 3B:
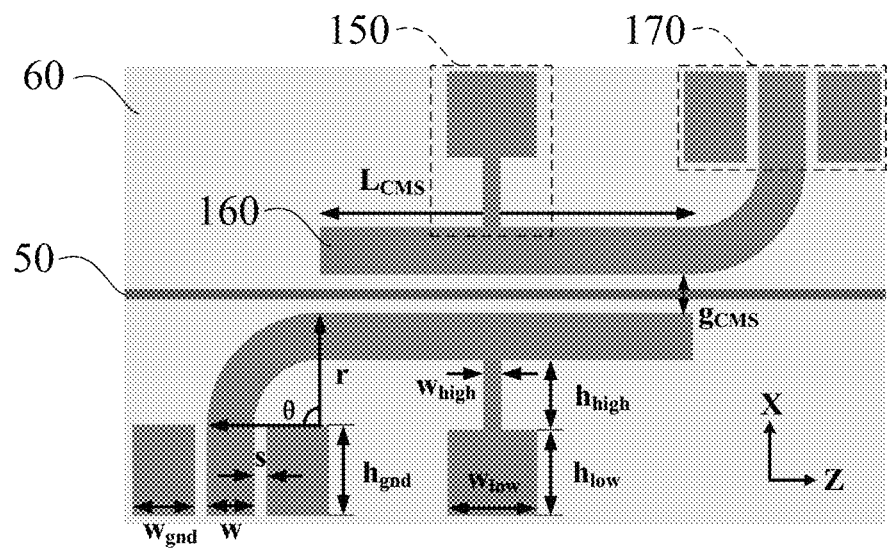
FIG. 3B depicts top-view of the RF and DC contacts of the designed spatial light modulator and an optical binary coding mask as quantizer.

FIGS. 1, 3A, and 3B depicts an-all optical ADC 200 based on SLM sampler realized using 1D PhC and optical aperture based optical quantizer. There are two portions for the designed AOADC: 1) a sampler including of a short optical periodic light source 204 and a spatial light modulator, and 2) a quantizer, like an optical coding mask (either binary code or Gray code) 208. The device may be made on the first part and primarily on SLM.

The performance of an AOADC device is generally categorized and expressed by two parameters, namely, the sampling rate and the resolution. The sampling rate defines how fast a digitalized code is generated by the ADC 200. The resolution refers to the dynamic range or the noise performance of the ADC 200 providing high quantization level accuracy. These parameters are largely influenced by the sampler portion of an ADC.

An RF electrode configuration of lateral coupled microstrip (CMS) is employed for the SLM design for broad modulation bandwidth. As an example of E-O polymer, CPO-1/PMMI guest-host system is used as the optical core 212 material, and it has a refractive index of $n_0=1.63$ and a conservative E-O coefficient of $r_{33}=70$ pm/V at 1550 nm. Norland Optical Adhesive 65 (NOA65) may be used as cladding material 216 with a refractive index of 1.51, a loss tangent of tan $\delta=2.2\times10^{-2}$. The in-plane optical waveguide 212 is placed in the gap 214 between the electrodes 213 where the RF electrical field maximized to ensure the highest optical-electrical waves overlap efficiency. There are DC access 210 and RF access 211 zones locates on the ADC 200.

An RF transition from coplanar waveguide (CPW) terminals to microstrip (MS) line is CPW-MS providing a single ended input and then from MS to CMS transitions generates a differential structure required for push-pull topology. Virtually ground technique using capacitive effect is adopted for the CPW terminals at high frequencies. The transitions are combined with capacitively grounded CPW (CG-CPW) for ease of fabrication and avoid expensive via hole realization. The CG-CPW is employed for high-speed RF connections of digital receiver and is usually driven by drive/power amplifier. RF design optimization of overall electrode structure is achieved to match for a 50-Ω reference system, but could be applied for any other impedance references.

To optimize the excitation of E-O effect, CPO-1 chromophore may be poled by a high DC electric field as that of propagation direction of odd-mode excitation. Even though the E-O polymers used to suffer from long terms stability, however, new synthesized chromophores such as CPO-1 exhibited a longer-term stability; nonetheless, for long-term operation one could consider re-poling process. Therefore, DC poling contacts 210 are connected to the CMS electrodes; in one embodiment the DC contacts 210 could be realized using Hi-Lo impedance lowpass filter designs to avoid possible leakage of RF signal from the DC contacts 210 during the E-O modulation period. This leakage could influence the passband characteristics of CG-CPW to MS and then from MS to CMS behavior.

The electrode structure is shallowly buried inside the cladding 216 to form a buffer layer, which controls how much dispersive effect is incorporated from the 1D or 2D or 3D PhC structure(s) 220 to the optical waveguide.

As an example of an invention embodiment, 1D PhC model is a combination of alternating layers of PMMI and air and could interact with optical waveguide in superstrate. Other embodiment could use $SiO_2$ and $Si_3N_4$ as substrate material. In the 1D PhC as superstrate, the lattice constant of $a=500$ nm is selected for PMMI/Air to enable 1550 nm light wave to propagate in the $1^{st}$ dielectric band. The filling fraction, f, is the ratio between the thickness of the low-s material (air) and the periodicity a; such value is optimized in our design to be 0.5 to achieve a slow-wave structure. The thickness of PhC layer 220 may also be optimized to avoid excessive optical energy dissipating inside the layer, but also ensure effective dispersion-effect be generated.

The PhC layer 220 may be covered by a superstrate material prism 224 with a greater than the effective index of the optical waveguide to create a leaky wave structure. Therefore, the guided mode of light is coupled to radiation mode, and then leak out from the waveguide. The leaky waves in time T, 2T, 3T . . . for instance, where T is an arbitrary time period and reciprocal of clock frequency for Nyquist sampling rate, propagate inside the superstrate. The prism like shape of superstrate 224 translates the leaky wave to be refracted to formulate an image line at output. The applied RF signal causes change in refractive index of the optical waveguide and hence alters such deflection angle. The image line therefore shifts up and down of an optical aperture of $2^m$ by m with desired coding mask 208. Behind the optical apertures are high-speed photo-detectors (not shown) with m separate outputs as a digital word. With an optical coding mask 208 placed in an appropriate location behind a lens 228, the moving image is read as successive digitized signals.

A silicon wafer 232 with a ground plane 236 resting thereon forms the base for the ADC 200.

Figure 2A:
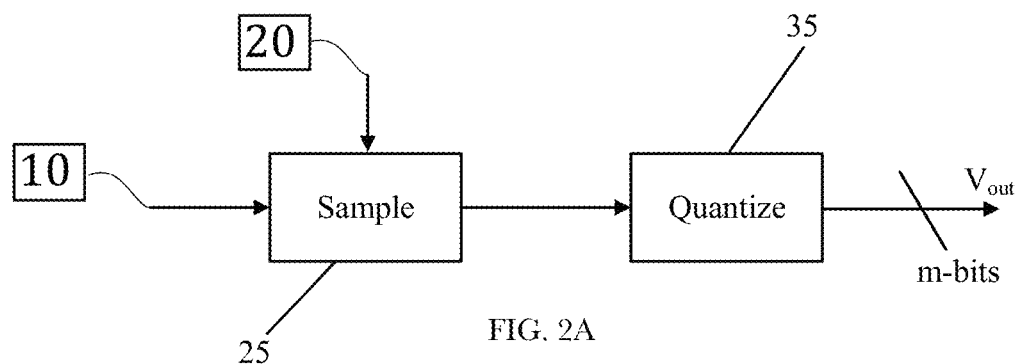
FIG. 2A depicts the configuration of ADCs that includes two major processes: sampling and quantization.

FIG. 2A depicts the configuration of ADCs which includes two major processes: sampling 25 and quantization 35. The inputted RF signal 20 is sampled by accurate optical clock 10 and quantized at discrete time intervals related to sampling rate. For example, in an RF signal 20 with bandwidth of 20 GHz, a Nyquist clock 10 at rate of 40 GSPS with optical pulses with duration of T=25 ps is required.

Figure 2B:
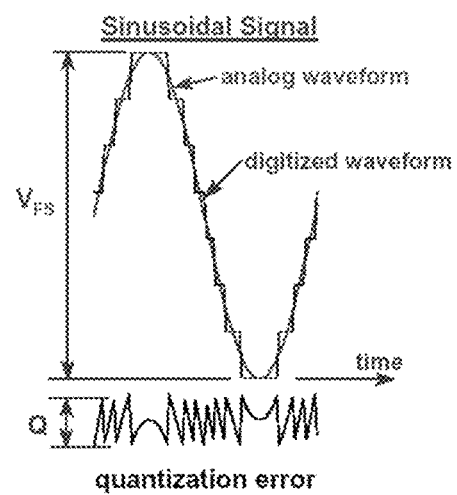
FIG. 2B is an example of quantization noise for a sinusoidal signal.

FIG. 2B is an example of quantization noise for a sinusoidal signal. $V_{FS}$ is the full-scale voltage and Q is the size of quantization level. Based on the quantization level, the signal is represented by a m-bit digital code. The quantization error is defined as the difference between the amplitude of analog and digitized waveforms, and such error associated with the quantization process is within ±Q/2, where Q is the smallest quantizing step. For the shown example a 10 dBm RF power applied to AOADC in a 50Ω load system requires a 1V peak voltage that provides a 2V of $V_{FS}$. For a 3 bits ADC, $V_{FS}$ of 2 V is subdivided to 8 levels, each with quantization of Q=250 mV.

FIG. 3A depicts the conceptual representation of a spatial light modulator SLM 300 based AOADC with an optical source clock 10, an E-O polymer based leaky optical waveguide 50 separated from integrated 1D PhC layer 40 with buffer layer 140 that is driven by RF signal 20 using in-plane CMS electrodes 160. The superstrate material 30 causes leaked optical waves 90 to exit the SLM. A cylindrical lens of 100 focuses exiting leaked wave of 90 on an optical binary coding mask of 110 as quantizer. The superstrate 30 acts as a prism layer (As also discussed with respect to FIG. 1) and glued on top of the 1D PhC layer 40 to deflect optical leaky wave at an angle of 120 degrees. The optical leakage losses are optimized using buffer layer 140 to achieve large enough active aperture on prism 30 to achieve angular resolution of 130.

FIG. 3B depicts a top-view of the RF and DC contacts of the designed spatial light modulator 300l and an optical binary coding mask as quantizer. Optical waveguide 50 may be sandwiched between CMS electrodes 160. The DC contact 150 renders realization of Hi-Lo lowpass filter used for poling of E-O polymer, such as COP-1/PMMI. A PMMI layer 60 acts as cladding layer. The CG-CPW contact 170 provides access to RF drive/power amplifier and 50 W load, which are external to this SLM 300. As an example of 40 GSPS AOADC that is realized based on the available materials, the optimized physical dimensions of the designed SLM are: $W_{gnd}$=2 mm, W=94 μm, s=60 μm, θ=90°, r=0.994 mm, $L_{CMS}$=1 cm, $g_{CMS}$=10 μm, $h_{high}$=4 min, $W_{high}$=10 μm, $h_{low}$=2 mm and $W_{low}$=3 mm.

Figure 4:
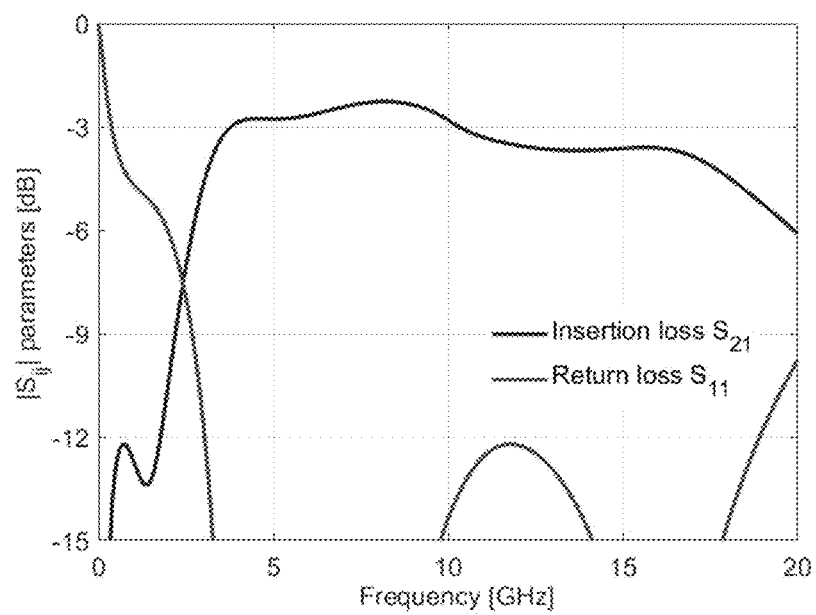
FIG. 4 depicts the simulated RF performances in terms of insertion loss (S21) and return loss (S11).

FIG. 4 depicts the simulated RF performances in terms of insertion loss ($S_{21}$) and return loss ($S_{11}$) of the designed electrode structure using transitions from CG-CPW 170 to MS and then from MS to CMS 160 and then in return back from CMS to MS and from MS to CG-CPW transition with the DC poling contacts 150 in the form of a second order Hi-Lo lowpass filter. The insertion loss represents a bandpass behavior with first pass-band corner frequency of about 4 GHz and second pass-band corner frequency of about 20 GHz. The high-pass behavior is caused by CG-CPW and when via holes are used, the lowpass behavior is achieved. 20 pF eternal capacitors loading the CG-CPW of 170 could lower this first pass-band to as low as 300 MHz. The observed ripples may be due to the second order Hi-Lo lowpass filter used to block off RF signal leakage through the DC contacts 150, while providing high DC voltage required for poling of E-O polymer in the leaky wave optical waveguide 50.

Figure 5A:
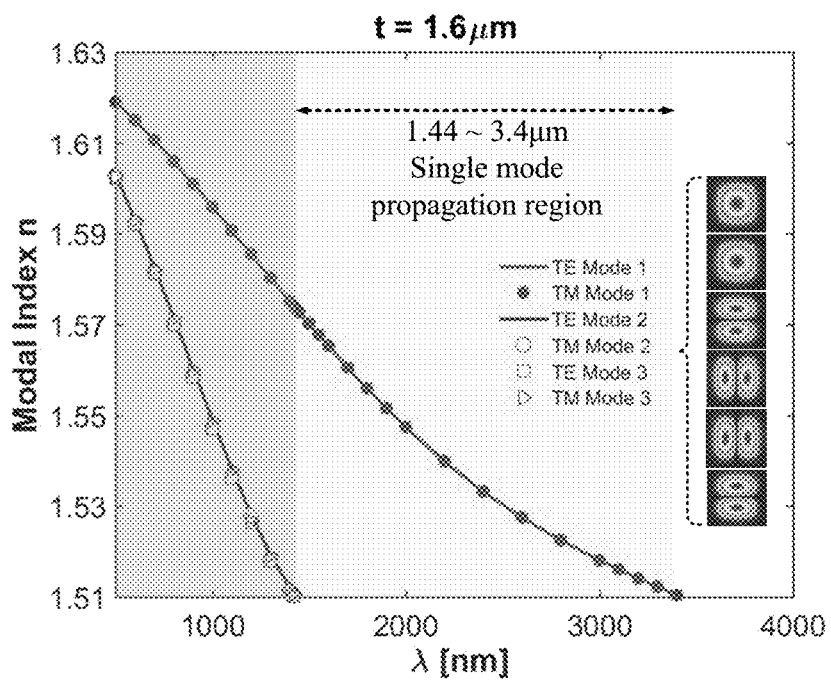
FIGS. 5A and 5B are graphs of effective index of refractive of the first six guided TE/TM modes inside the E-O polymer.
Figure 5B:
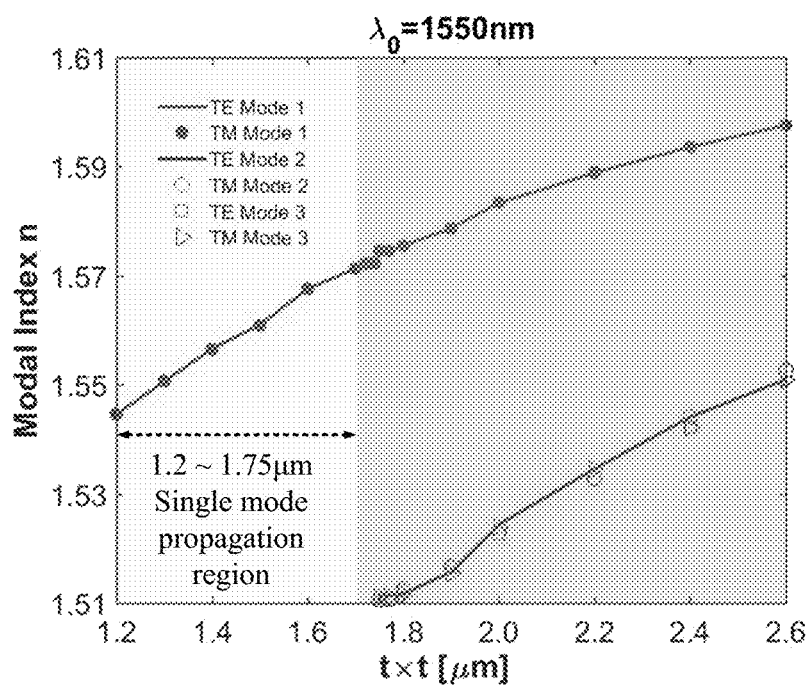

FIGS. 5A and 5B show graphs of effective index of refractive of the first six guided TE/TM modes inside the E-O polymer, such as COP-1/PMMI, optical waveguide wherein the dimensions of the waveguide are fixed by 1.6 μm×1.6 μm in FIG. 5A. Optical field profile of these six TE/TM modes are also depicted in inset. Single mode operation for fixed wavelength of $\lambda_0$=1550 nm is depicted in FIG. 5B. In this, the dimensions of the optical waveguide re fixed by 1.6 μm×1.6 μm to assure single TE/TM modes propagation over 1.2 to 1.75 μm region.

Figure 6A:
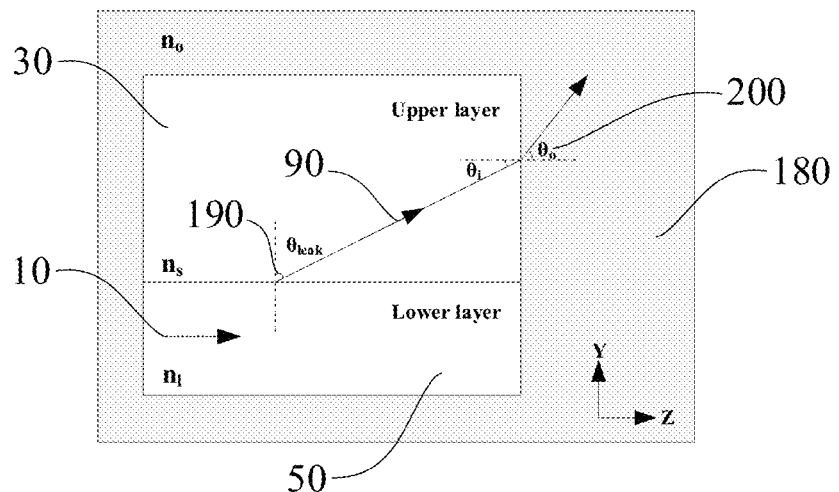
FIG. 6A depicts propagation dispersion in a phase matching diagram.

FIG. 6A shows propagation dispersion in a phase matching diagram. A short optical clock 10 is inputted to optical guide 50. With the phase forced to be matched along the tangential direction of the interfaces by the boundary condition, and all interfaces are parallel to each other, the $k_z$ components in each layer are therefore identical based on Snell's law. The effective index and thickness of the 1D PhC layer 40 combined with the buffer substrate affect the leaky coefficient and hence the leaky angle $\theta_{leak}$ 190, so for simplicity and avoiding a complicated dispersion diagram, those layers are not shown in the dispersion diagram. At interface of the superstrate 30 with the air interface 180, the leaky waves hit the edge at an incident angle $\theta_i$ 90 and are transmitted into the air at an output angle $\theta_o$ 200. Si-photonics based substrate is the basis of realizing this SLM.

Figure 6B:
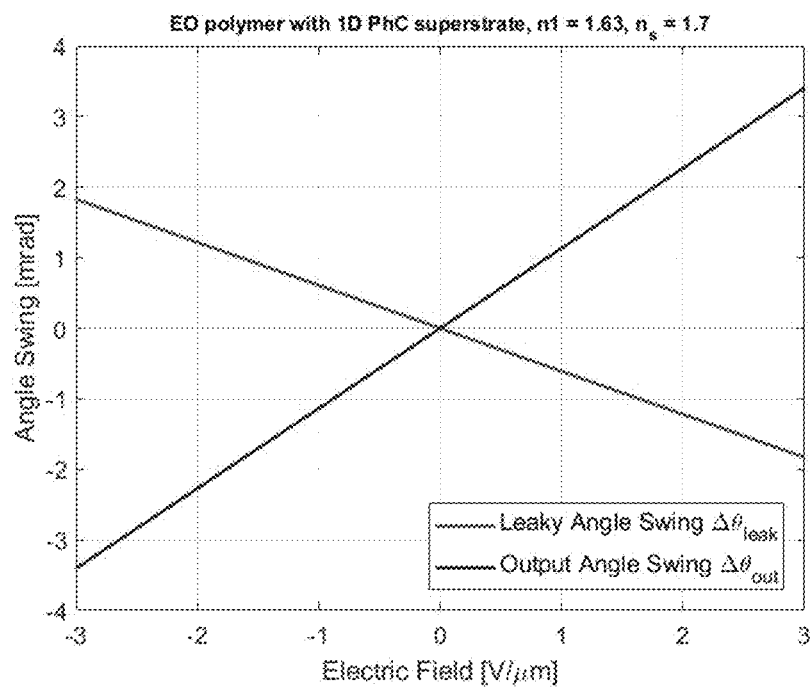
FIG. 6B is a graph of calculated leaky angle and output angle swing against the applied RF electrical field.

FIG. 6B is a graph of calculated leaky angle and output angle swing against the applied RF electrical field. The leaky angle is defined by Snell's law:

$$\theta_{leak} = \sin^{-1}\left(\frac{n_{eff}}{n_s}\right), \qquad \text{EQ. 1}$$

where $n_{eff}$ is the effective index of refractive of the waveguide by solving the optical mode inside the waveguide surrounding by cladding material. The output angle swing is then derived by $$\Delta\theta_{out} = \frac{1}{2}\frac{\cos\theta_i}{n_o \cos\theta_{leak}\sqrt{1-\left(\frac{n_s}{n_o}\sin\theta_i\right)^2}}n_1^3 r_{33}\vec{E}. \qquad \text{EQ. 2}$$

where $r_{33}$ is the linear E-O coefficient and E is the magnitude of applied RF signal.

Figure 7A:
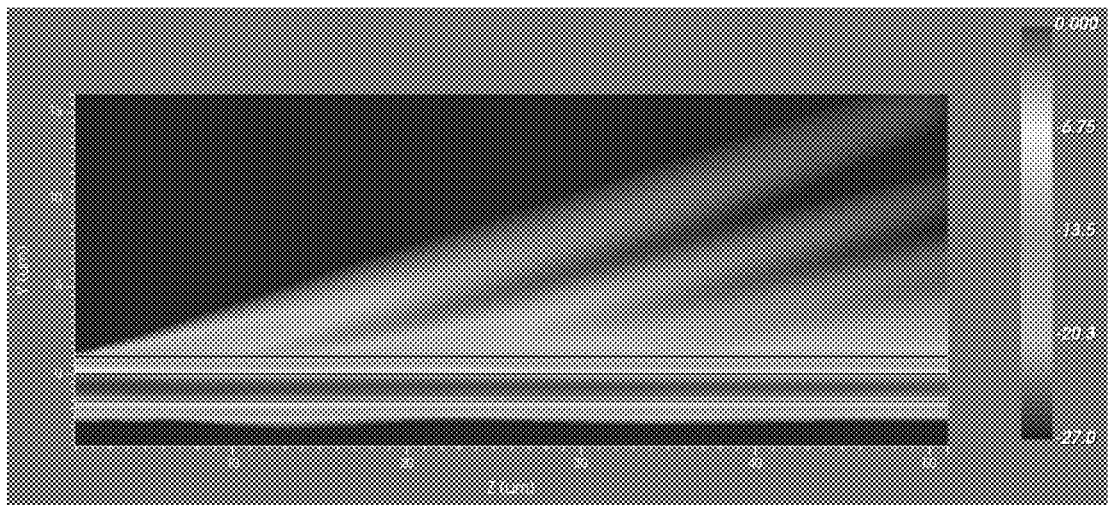
FIGS. 7A-7C show conceptual demonstrations of the leaky-wave sweeping as a function of magnitude of the applied RF electrical field.
Figure 7B:
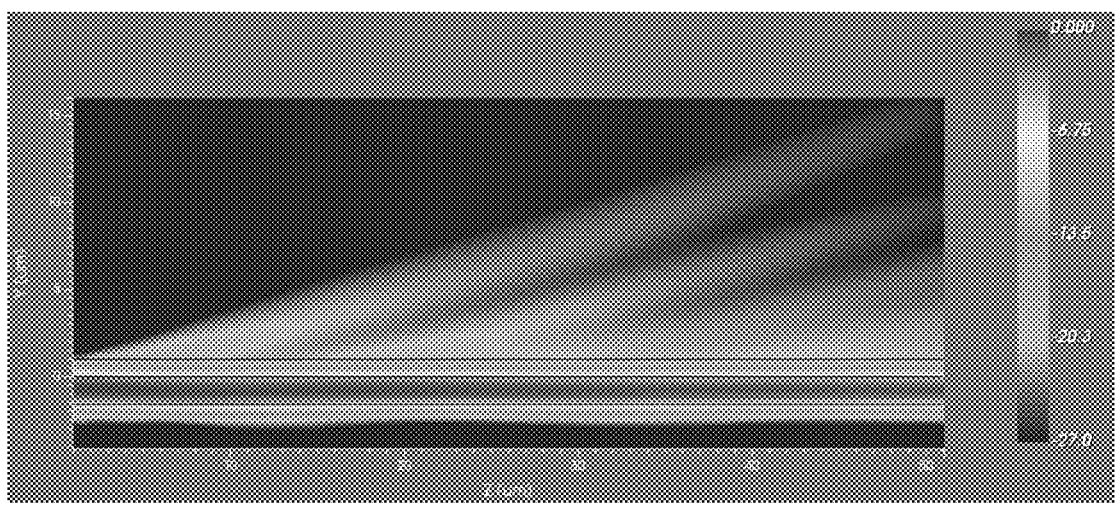
Figure 7C:
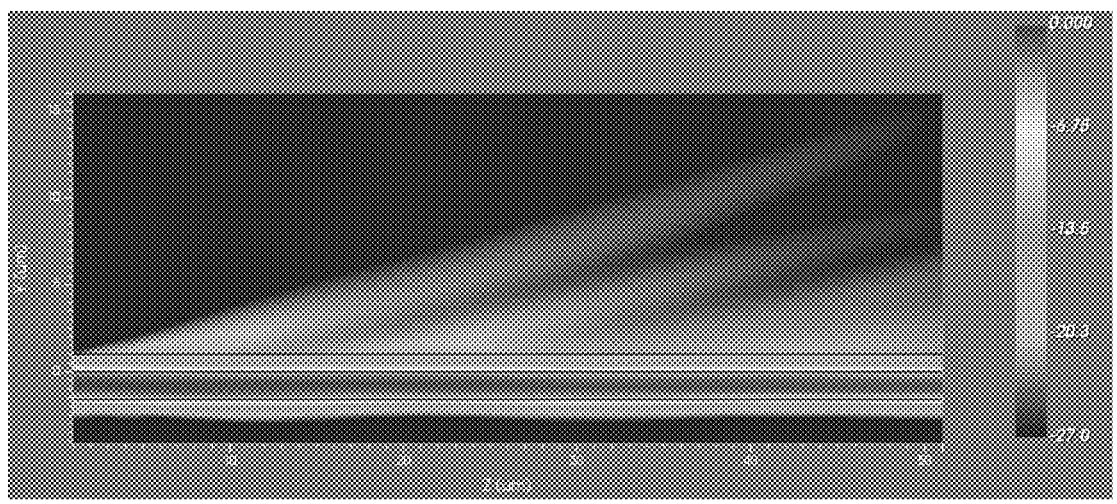

FIGS. 7A, 7B and 7C are conceptual demonstrations of the leaky-wave sweeping as a function of magnitude of the applied RF electrical field. FIG. 7A illustrates E=−500 V, FIG. 7B illustrates E=0 V, and FIG. 7C illustrates E=500 V. Consecutive images show changes in the deflected beam angle out of the leaky waveguide and optical power level in substrate. The higher the sensitivity of SLM (i.e., a higher effective E-O coefficient of $r_{33}$) results in a larger angle sweep of deflection angle of $\Delta\theta$ 120. The longer the light is maintained in the optical waveguide by keeping a low optical loss (i.e., low optical leakage coefficient and for example 5 dB/cm) by control of thickness of buffer layer of 140, a higher resolution AOADC is realized with the optical deflected beam angle resolution of $\delta\theta$ of 130. The ENOB is calculated as $\log_2 (\Delta\theta/\delta\theta)$. The color bars shows optical power levels of 0 dBm (red) to −27 dBm (blue), which indicates small leakage to achieve ENOB of 7.5 for about 8 bits of resolution.

Figure 8A:
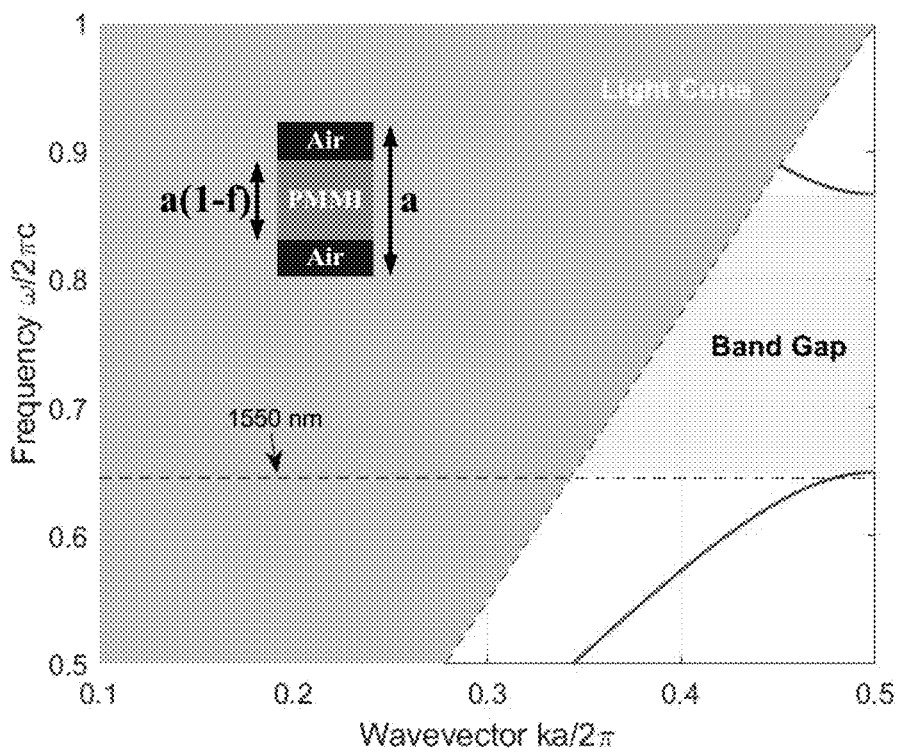
FIG. 8A is a graph of photonic band structure.

FIG. 8A is a graph of photonic band structure of the 1D PhC slow-wave structure with lattice constant a=500 nm and filling factor f=0.5.

Figure 8B:
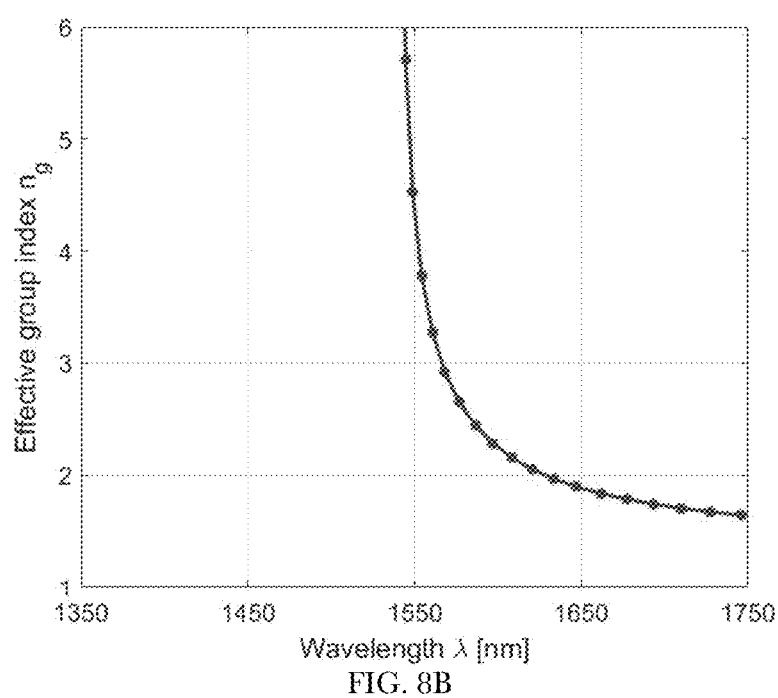
FIG. 8B is a graph of calculated effective group index.

FIG. 8B is a graph of calculated effective group index of 1D PhC structure of FIG. 8A versus normalized wave vector for lattice constant of a=500 nm and filling factor of f=0.5. If group index $n_g$ is far larger than refractive index n of the material at ultra-high frequencies, dispersive effect is then expressed by $$n_g \approx \omega \frac{\partial n}{\partial \omega} = \omega \frac{\Delta n}{\Delta \omega} = \frac{\Delta n}{\Delta \omega/\omega} \qquad \text{EQ. 3}$$

where $\Delta\omega/\omega$ is normalized bandwidth and $\Delta n$ is index variation with respect to frequency response.

Figure 9:
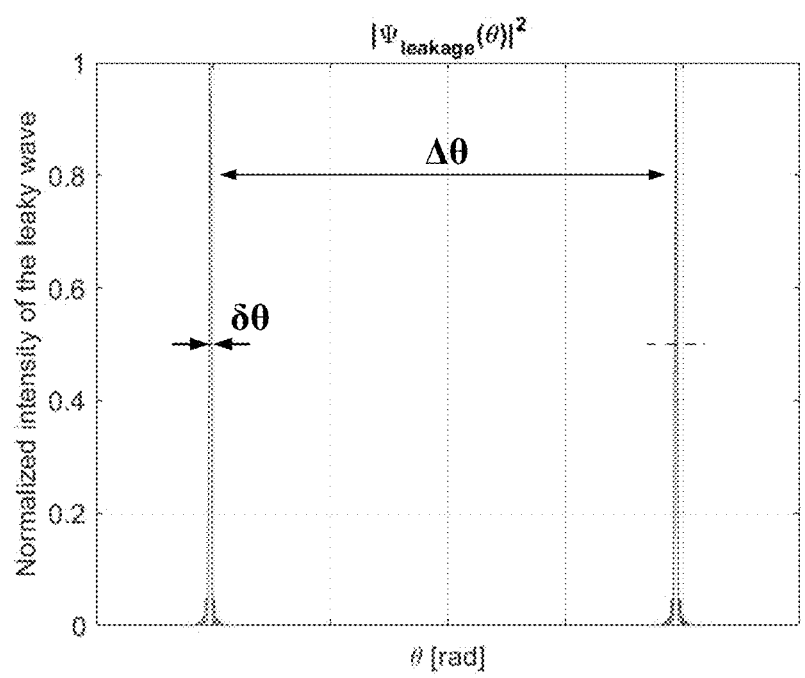
FIG. 9 is a graph of simulated angular distribution of the leaky wave intensity.

FIG. 9 is a graph of simulated angular distribution of the leaky wave intensity with the optical deflected beam swing angle of $\Delta\theta$ (120) and diffracted beam resolution angle of $\delta\theta$ (130).

A combination of analytical calculations, Matlab numerical calculations, and commercial software modeling and simulations were used for physical understanding and optimized design of SLM to operate effectively as an optical sampler in 40 GS/S AOADC with ENOB of about 8. Optimized performance was attained with addition of PhC structure for slow wave effect. Even though modeling was provided for 1D PhC of PMMI and air as superstrate, other designs of 2D and 3D superstrates as well as 1D, 2D, and 3D substrates of $Si_3N_4$ with $SiO_2$ could also be used. The following predictions are made of 1D PhC of structure depicted in FIG. 8A.

Half-wave voltage ($V_\pi$) of the designed modulator without PhC layer is calculated by 7.2 V×cm using the following formula:

$$V_\pi = \frac{\lambda_0 \cdot g_{CMS}}{r_{33} \cdot n_{eo}^3 \cdot \Gamma \cdot L} \qquad \text{EQ. 4}$$

where L of 1 cm is the interaction length and $\Gamma$ is the field overlap efficiency between RF field and optical field with estimated 80%. $g_{CMS}$ is gap of 10 μm for CMS lines, $n_{eo}$ is index of refraction of E-O material and is 1.55 at wavelength of $\lambda_o$=1550 nm, and $r_{33}$ is E-O coefficient of CPO-1/PMMI of 70 pm/V.

The simulated figure of merit of $V_\pi$×L using commercial optical simulator, OptiBPM, is approximately 3.7 V×cm; therefore, the effective E-O coefficient is theoretically calculated to be increased from 70 pm/V to 136 pm/V. The propagating light is then effectively retarded.

The spatial light modulator structure is simulated using commercial optical simulator, OptiFDTD. The total optical attenuation observed at the point of 1 cm away from the input is 5 dB/cm; 77% of which is enticed from the optical waveguide by the 1D PhC layer and then leaked into the prism layer.

The total leaky optical field is derived by $$\psi = \alpha_{leak} A e^{-jk_s h_{buffer}} \int_0^L e^{[-(\alpha_{leak}+\alpha_{opt})-j(\beta-k_s \sin\theta_{leak})]z} dz \qquad \text{EQ. 5}$$

Where $\beta = k(n_{eff} + 0.5 \times n^3_{eff} r_{eo} \Gamma E_0 e^{-\alpha RFz})z$ is the phase propagation constant. $\alpha_{RF}$ is total RF loss, $\alpha_{leak}$ is optical attenuation due to leaky effect, $\alpha_{opt}$ is optical attenuation inside waveguide due to material loss, $k_x$ is the optical wavenumber in prism and A is the magnitude of input light field.

By solving the leaky optical field in a custom Matlab program with the simulated values, the total angular sweep $\Delta\theta$ and leaky wave divergence resolution $\delta\theta$ are defined in FIG. 9. The resolution of the designed AOADC expressed by effective number of bits (ENOB) was then calculated as $\log_2(\Delta\theta/\delta\theta)$. As shown, the ENOB is 7.5, which is close to targeted 8 bits of resolution.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination. Further, reference to values stated in ranges include each value within that range.

A person of ordinary skill in the art would understand that various changes or modifications may be made thereto without departing from the scope of the claims.

We claim:

1. A spatial light modulator (SLM) device within an all-optical analog to digital converter (AOADC) comprising:
   a first radio frequency (RF) electrode;
   a second RF electrode positioned in-plane and adjacent to the first RF electrode; an integrated electro-optic (E-O) polymer based optical waveguide positioned in-plane and sandwiched between the first RF electrode and the second RF electrode, wherein the integrated E-O polymer based optical waveguide is integrated with a photonic crystal (PhC) layer separated from the integrated E-O polymer based optical waveguide by a buffer layer defined by the first RF electrode and the second RF electrode such that the PhC layer is offset transversely with respect to the first RF electrode, the second RF electrode, and the integrated E-O polymer based optical waveguide to form a leaky waveguide structure that re-directs light to form the SLM, wherein a leaky wave exit angle from the integrated E-O polymer based optical waveguide is configured to be controlled by an RF signal applied to the leaky waveguide structure, and wherein the applied RF signal is quantized at discrete time intervals based on a sampling rate of the applied RF signal.

2. The SLM of claim 1, wherein the integrated E-O polymer based optical waveguide is compatible with Si-Photonics.

3. The SLM of claim 1, wherein DC contacts rendering realization of a lowpass filter are used for poling of the integrated E-O polymer based optical waveguide.

4. The SLM of claim 1, wherein a superstrate material prism is comprised in the leaky waveguide structure.

5. The SLM of claim 1, wherein the applied RF signal causes a change in a leakage angle of an optical wave in a superstrate.

6. The SLM of claim 1, wherein a travelling wave push-pull topology of the RF electrodes provides a broad bandwidth of the RF modulated SLM.

7. The SLM of claim 1, wherein the RF signal is a voltage applied to push-pull electrodes.

8. The SLM of claim 1, wherein a gap between push-pull electrodes is configured to control an RF electric field.

9. The SLM of claim 1, wherein an applied RF electric field changes an index of refraction due to the Pockels effect.

10. The SLM of claim 1, wherein a change in an index of refraction in the optical waveguide adjusts an exit angle from the optical waveguide based on a dispersion diagram and the Snell's law.

11. The SLM of claim 1, wherein the PhC layer is configured to decrease a wave velocity through the integrated E-O polymer based optical waveguide.

12. The SLM of claim 11, wherein the PhC layer is configured to influence an effective group index at an operating optical wavelength.

13. The SLM of claim 11, wherein SLM sensitivity is configured to be controlled by the PhC layer integrated with the buffer layer.

14. The SLM of claim 1, wherein optical leakage of the leaky waveguide structure is configured to be controlled by adjusting an applied electric field in a gap of a push-pull travelling wave structure.

* * * * *